United States Patent [19]

Marazzi

[11] 4,390,237

[45] Jun. 28, 1983

[54] COUPLING ASSEMBLY FOR LIGHT WAVE CONDUCTORS AND METHOD FOR THE PRODUCTION THEREOF

[75] Inventor: Silvio Marazzi, Cavigliano, Switzerland

[73] Assignee: Diamond S.A., Losone, Switzerland

[21] Appl. No.: 177,881

[22] Filed: Aug. 14, 1980

[30] Foreign Application Priority Data

Aug. 15, 1979 [CH] Switzerland .................. 7467/79

[51] Int. Cl.³ .............................. G02B 5/14
[52] U.S. Cl. .............................. 350/96.20
[58] Field of Search ............ 350/96.20, 96.21, 320

[56] References Cited

U.S. PATENT DOCUMENTS 4,225,214  9/1980  Hodge et al. ............. 350/96.21
4,264,128  4/1981  Young ..................... 350/96.20

*Primary Examiner*—David K. Moore
*Attorney, Agent, or Firm*—William R. Hinds

[57] ABSTRACT

The coupling assembly for light wave conductors has a capillary tube which surrounds the light wave conductor and which is received, together with the light wave conductor, by a holder tube. The holder tube is in turn secured in a centering sleeve. The centering sleeve comprises a material with a Mohs hardness which is equal to or greater than 8.5.

8 Claims, 7 Drawing Figures

COUPLING ASSEMBLY FOR LIGHT WAVE CONDUCTORS AND METHOD FOR THE PRODUCTION THEREOF

FIELD OF THE INVENTION

This invention is concerned with a coupling assembly for conductors of light-waves of which an end portion is fixed in the bore of a holder tube and the tube is arranged in a centering sleeve and to a method for the production thereof.

BACKGROUND OF THE INVENTION

Various different forms of coupling assemblies of this kind are known and conventional. The purpose of such coupling assemblies is for the end of a light-wave conductor to be fixed, in relation to the centering sleeve of a coupling, in such a way that, when connecting two light-wave conductors which are held in centering sleeves of this kind, the light conductor cores are disposed centrally and axially in alignment with each other. Any defect in alignment between the light-wave conductor end portions results in transmission losses in the coupling assembly.

Generally in known coupling assemblies, the exposed light-wave conductor end portion is secured in a holder tube which in turn is fixed in relation to a centering sleeve. The accuracy required in making connections of this kind is of the order of a few thousandths of a millimeter, and this makes it difficult to make holder tubes, and more particularly to make bores for light-wave conductor end portions of very small diameter. In addition, problems occur in the manufacture of the centering sleeves as even very slight deformation or stressing, for example, during assembly can result in a defect in alignment of some thousandths of a millimeter.

An object of the present invention is to eliminate the disadvantages of the known art and in particular to provide a coupling assembly for light-wave conductors, and a method for the production thereof, which ensures the highest degree of accuracy, with a very simple structure and a simple mode of assembly.

DESCRIPTION OF THE PRIOR ART

These and other difficulties involved in adjusting the light-wave conductor end portions in a coupling assembly can be seen in particular from German DOS Nos. 26 26 243 and 27 04 140 or German DAS No. 23 52 874.

SUMMARY OF THE INVENTION

The present invention provides in a coupling assembly for light-wave conductors, wherein a light wave conductor end portion is fixed in the bore of a holder tube and the tube is arranged in a centering sleeve, the improvement in that at least one capillary tube is provided between the holder tube and the light wave conductor end portion.

It is relatively simple to produce a capillary tube of this kind, in particular from drawn glass, and this makes it possible to increase the diameter of the receiving bore in the holder tube. This in turn provides for easy production of the holder tube with a high degree of accuracy and also makes it possible to produce relatively long holder tubes which ensure a reliable axial gripping action on the light-wave conductor end portion and which can be arranged to extend beyond the end of the centering sleeve in such a way that, by means of suitable adjusting means, the holder tube can be engaged from behind, fixed and adjusted. In this arrangement, the capillary tube can be in one piece or can comprise a plurality of pieces. An important factor is that it is fitted with close tolerance pairing, with a sliding fit, onto the light-wave conductor end portion, and can therefore be fixed, for example, by means of adhesive. In this respect, it is also advantageous for the capillary tube in turn to be arranged in the holder tube with close tolerance pairing, with a sliding fit, so that the connection between the light-wave conductor end portion and the capillary tube and the holder tube can be produced without expensive and complicated adjustment, by pushing one component onto the other and fixing by adhesive.

If the capillary tube is a glass tube, it is very advantageous that, when the light wave conductor end portion is ground at its end, there is no danger of the end face being contaminated by metal turnings or machining material.

It is particularly advantageous for the centering sleeve for receiving the arrangement comprising the light wave conductor end portion, capillary tube and holder tube, to comprise an isotropic sintered material and/or a polycrystalline and/or a monocrystalline material, with a Mohs hardness of at least 8.5. It will be seen that increasing the outside diameter of the holder tube, which is permitted by virtue of the combination with the capillary tube, also causes an increase in the inside diameter of the centering sleeve, and this permits the use of hard sintered materials or crystalline materials which are ground with a very high degree of accuracy and which are not deformed by tensile or compression loadings so as to cause defective alignment in respect of the light-wave conductor end portions.

The coupling assembly may be produced in a particularly advantageous manner, with a centering sleeve comprising hard metal or sinter metal. However, the centering sleeve may also be produced from ceramic materials, boron nitride, polycrystalline diamond, sapphire, ruby or natural diamond. The combination of such materials, for example, in a multilayer structure is also possible and is advantageous for certain areas of use.

The fixing and securing of the light-wave conductor end portion in the capillary tube, the capillary tube in the holder tube, and the holder tube in a centering sleeve, is advantageously effected with a hardening material such as a two-component adhesive.

A particularly strong arrangement can be produced if the holder tube is longer than the capillary tube and receives the protective casing which surrounds the light-wave conductor.

In this respect, the connection between the holder tube and the centering sleeve is advantageously made after the adhesive has been introduced from the rear into the annular space between the holder tube and the centering sleeve, so as to avoid contamination of the end surface of the light-wave conductor end portion.

It will be seen that the inventive advance and the technical content of the subject of this application are provided not just by the individual features employed but in particular also by combining and sub-combining the features involved.

BRIEF DESCRIPTION OF THE DRAWINGS

In the accompanying drawings.

DESCRIPTION OF THE PREFERRED EMBODIMENT

Figure 1:
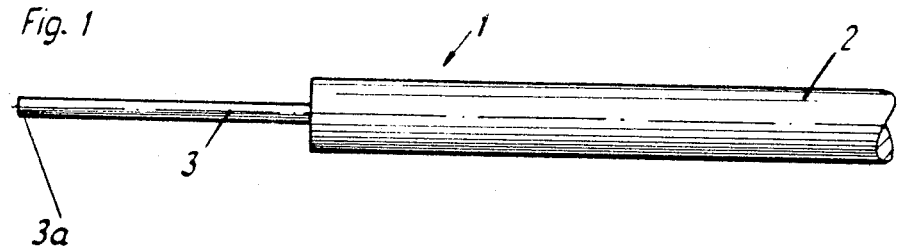
FIGS. 1 to 6 show successive steps in the construction of a coupling assembly having the features of the present invention.

Referring to FIG. 1, a light-wave conductor 1 has a plastics casing 2 which is removed from the end portion so that the glass fibre 3 which guides the light is exposed.

Figure 2:
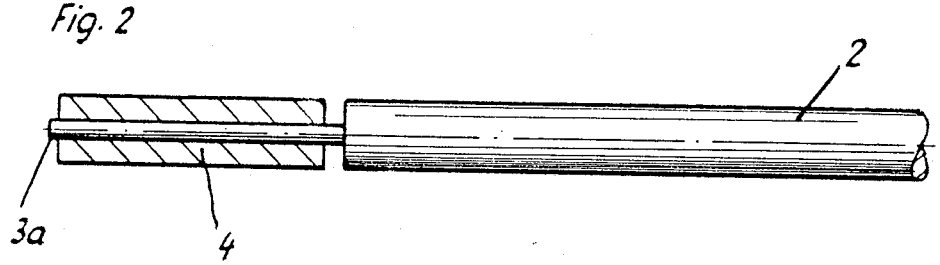

To produce a coupling assembly, a capillary tube 4 (see FIG. 2) made from drawn glass is fitted on to the end portion of the light wave conductor 1 and secured by adhesive. In this condition, the end 3a of the glass fibre 3 projects beyond the end face of the capillary tube 4.

Figure 3:
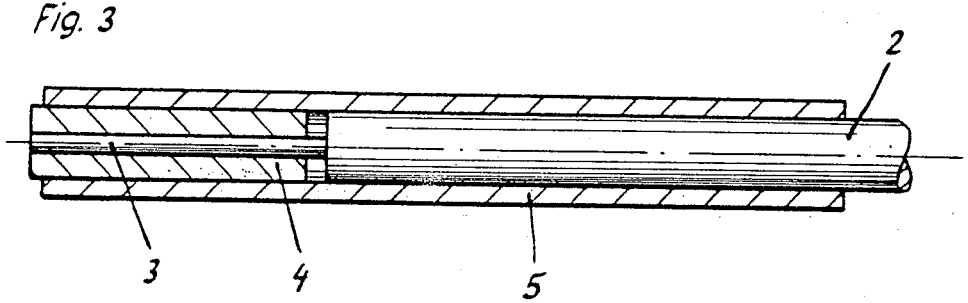

FIG. 3 shows the manner in which a holder tube 5 is fitted over the assembly comprising the capillary tube 4 and the light-wave conductor 1. The holder tube 5 is secured by adhesive, in a manner not shown in the drawing, both to the capillary tube 4 and to the plastics casing 2. This ensures optimum strength and provides a firm axial guiding and mounting action in respect of the glass fibre. FIG. 3 also shows that the projecting end 3a (see FIG. 2) of the glass fibre 3 is ground off at the end face of the assembly. This grinding operation is known and is therefore not described in greater detail herein. However, the capillary tube 4 and the holder tube 5 ensure that a satisfactory, flat end face extending at a right angle to the longitudinal axis of the conductor can be produced. The holder tube 5 is set back somewhat, relative to the end face of the capillary tube 4, ensuring that there is no contamination effect by metal turnings or machining material, when the glass fibre end 3a is ground.

Figure 4:
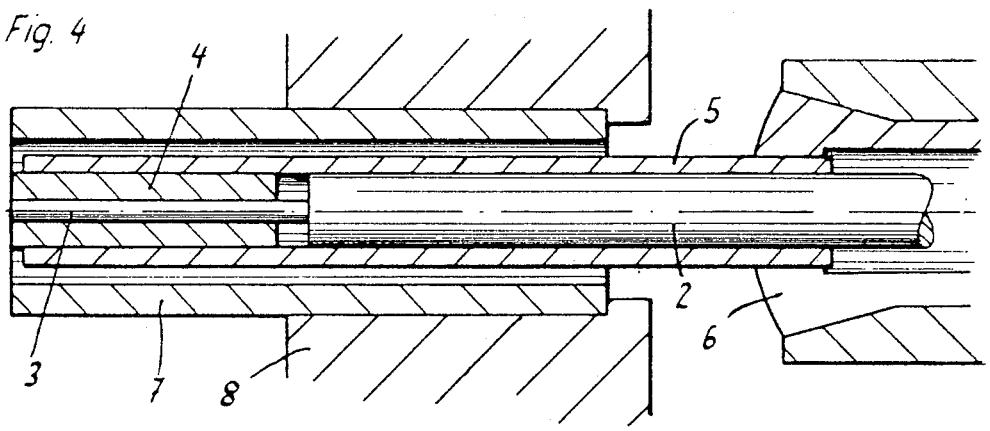

FIG. 4 shows how the assembly comprising the light-wave conductor 3, the capillary tube 4 and the holder tube 5 is secured in a clamping and centering device 6 (shown in diagrammatic form). In this respect, it is advantageous for the holder tube 5 to be of such a length that it projects beyond a centering sleeve 7 and can be gripped by the centering means 6. In this arrangement, the centering sleeve 7 is secured in a holder arrangement 8 (not shown in detail) which permits adjustment of the desired relative position of the glass fibre 3 in the axial centre of the centering sleeve 7. During the adjustment operation, the end face of the glass fibre 3 and of the capillary tube 4 are flush with the end face of the centering sleeve 7.

Figure 5:
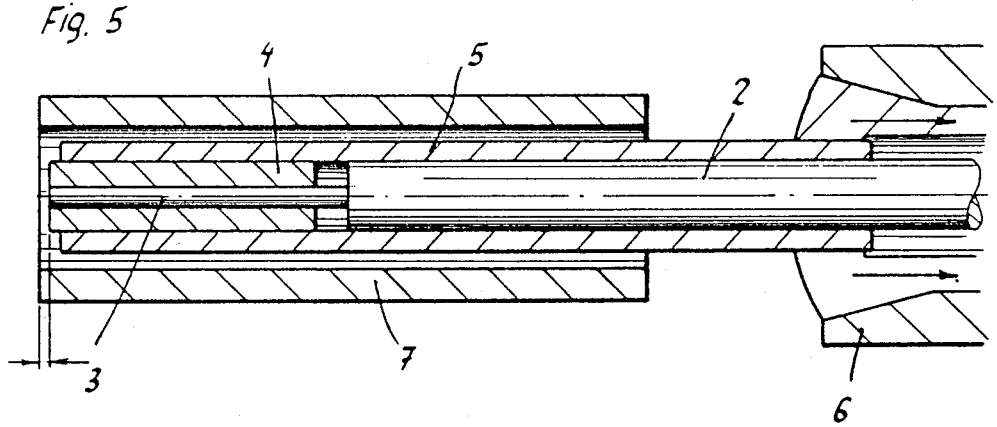

FIG. 5 shows the manner in which the end face of the glass fibre 3 is withdrawn rearwardly of the end face of the centering sleeve 7, by retracting the centering means 6 after termination of the centering operation, by an amount of about 1 to 3 thousandths of a millimeter, thereby reliably ensuring that, upon assembly, the end faces of two glass fibres do not rub against, and possibly cause damage to each other.

Figure 6:
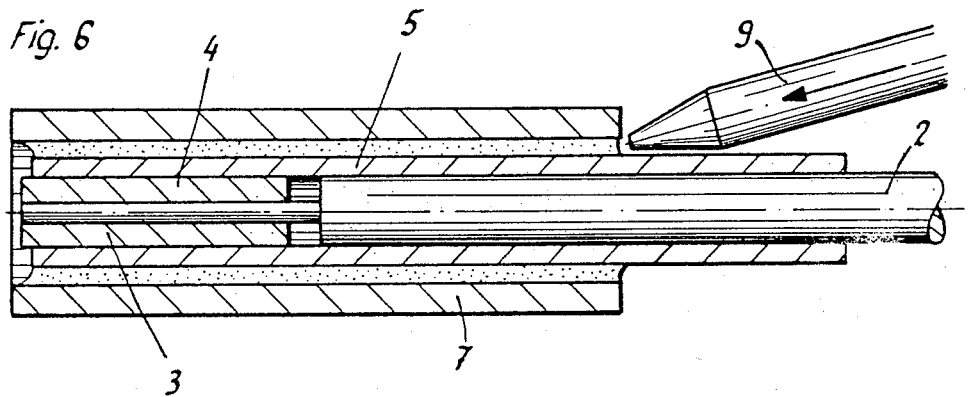

FIG. 6 shows how, after conclusion of this adjusting operation, quick-setting adhesive is introduced by means of a nozzle 9 into the annular space between the centering sleeve 7 and the holder tube 5. Because the adhesive is introduced or injected from the rear, this ensures that the end of the glass fibre 3 is not contaminated by adhesive.

Figure 7:
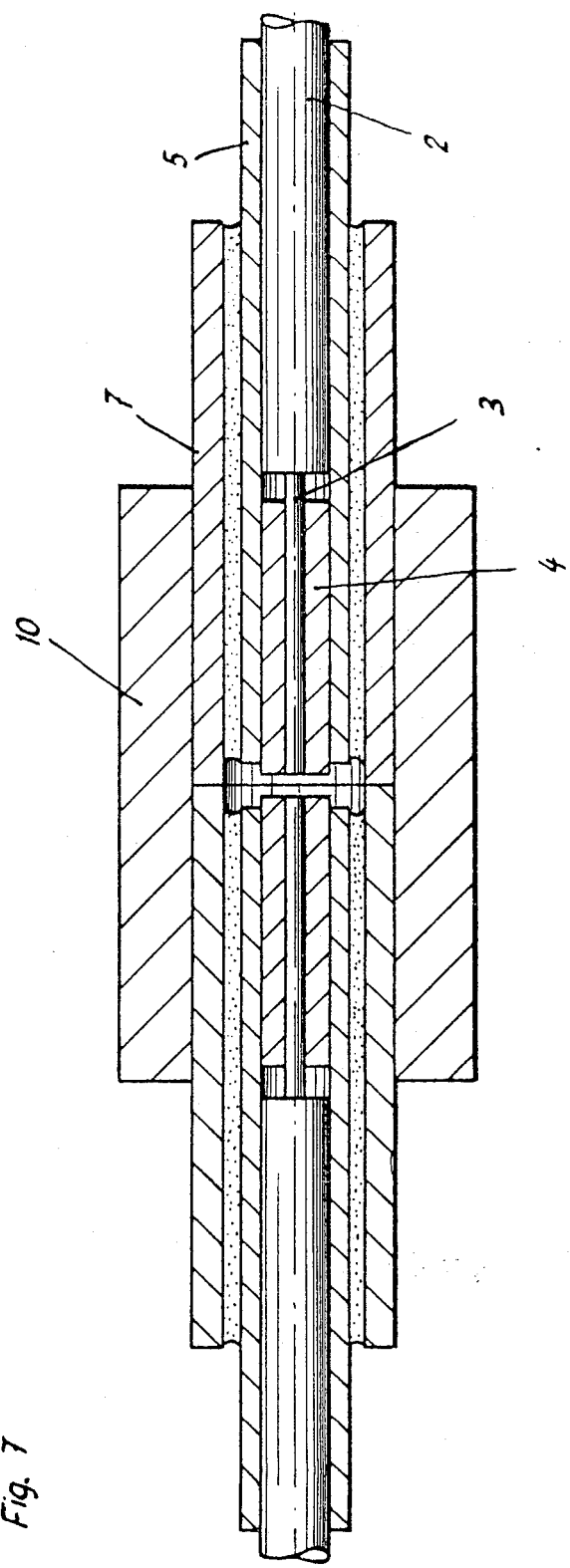
FIG. 7 shows two coupling assemblies in an assembled condition.

FIG. 7 shows two coupling assemblies in the assembled condition, with the two centering sleeves 7 being held together by a centering bush or muff 10. Both the centering bush 10 and the centering sleeves 7 are made from hard metal or sinter metal and have a degree of accuracy of the order of thousandths of a millimeter, both at the surfaces which are in engagement with each other and at the end surfaces which are in contact. Disposed in the space between the end surfaces of the two glass fibres 3 is a contact gel which in known manner ensures satisfactory transmission of the light waves between the glass fibres 3.

It will be seen that the overall assembly is distinguished by a high degree of accuracy, ease of assembly and simple general structure.

I claim:

1. A method of producing a coupling assembly for light-wave conductors, comprising
   fitting an end portion of a light-wave conductor into a capillary tube so that the end thereof projects from the capillary tube and fitting the capillary tube into a holder tube so that the end of the capillary tube projects from the holder tube, and securing the conductor end portion and the capillary and holding tubes together,
   grinding a flat end face on the conductor at right angles to its axis, and
   positioning the holder tube within a centering sleeve in a first position with the flat end face of the conductor in transverse alignment with an end face of the centering sleeve, and with the conductor and centering sleeve in axial alignment, and then withdrawing the holder tube within the centering sleeve to a second position to recess the flat end face of the light-wave conductor a distance inwardly from the centering tube end face and connecting the holder tube to the centering sleeve in the second position.

2. A method according to claim 1 wherein the holder tube and the centering sleeve are connected by adhesive introduced into an annular space therebetween at the end of the centering sleeve remote from its said end face.

3. A method according to claim 1 or claim 2, wherein the centering sleeve is formed of a material selected from the group consisting of isotropic sintered material, polycrystalline material and combinations thereof.

4. A coupling assembly for light-wave conductors comprising at least one capillary tube positioned on an end portion of a light-wave conductor with the at least one capillary tube being positioned within a holder tube which is axially centered and secured within a centering sleeve, the centering sleeve being formed of a material selected from the group consisting of isotropic sintered material, polycrystalline material and monocrystalline material and combinations thereof.

5. A coupling assembly according to claim 4, wherein the material forming the centering sleeve has a Mohs hardness of at least 8.5.

6. A coupling assembly according to claim 4 or claim 5, wherein centering sleeves carrying end portions of light-wave conductors are secured together in axial relationship by being positioned within a centering muff or bush of hard metal or sintered metal.

7. A coupling assembly as defined in claim 4, wherein the capillary tube projects at its end beyond the holder tube.

8. A coupling assembly as defined in claim 4, wherein the centering sleeve projects at its end beyond the capillary tube.

* * * * *